US008094627B2

(12) United States Patent
Drevon et al.

(10) Patent No.: US 8,094,627 B2
(45) Date of Patent: Jan. 10, 2012

(54) METHOD FOR THE SUPPORT OF HIGH BIT RATE SERVICES IN A MOBILE COMMUNICATION SYSTEM

(75) Inventors: Nicolas Drevon, Paris (FR); Laurent Thiebaut, Antony (FR)

(73) Assignee: Alcatel Lucent, Paris (FR)

( * ) Notice: Subject to any disclaimer, the term of this patent is extended or adjusted under 35 U.S.C. 154(b) by 1247 days.

(21) Appl. No.: 11/627,033

(22) Filed: Jan. 25, 2007

(65) Prior Publication Data

US 2007/0171831 A1 Jul. 26, 2007

(30) Foreign Application Priority Data

Jan. 26, 2006 (EP) .................................. 06300074

(51) Int. Cl.
*H04B 7/212* (2006.01)
(52) U.S. Cl. ........ 370/337; 370/321; 370/329; 370/336; 370/345; 370/347; 370/358
(58) Field of Classification Search .................. 370/321, 370/329, 336–337, 345, 347, 358
See application file for complete search history.

(56) References Cited

U.S. PATENT DOCUMENTS

| 6,172,968 | B1 * | 1/2001 | Rasanen ........................ 370/329 |
| 6,567,389 | B1 * | 5/2003 | Honkasalo et al. ........... 370/342 |
| 6,804,514 | B2 * | 10/2004 | Wiedeman et al. ........... 455/427 |
| 2005/0181805 | A1 * | 8/2005 | Gallagher .................. 455/456.1 |

OTHER PUBLICATIONS

3GPP: "Generic Access (GA) to the A/Gb interface; Mobile GA interface layer 3 specificatin" 3GPP TS44.318 (V6.3.0), Online Nov. 2005, pp. 1, 42, 43, 82-83, XP002384267.
3GPP: "Mobile radio interface layer 3 specification; radio Resource Control RRC", 3GPP TS44.018 (V7.2.0), Nov. 2005, pp. 1, 124-128-228-229, XP002384268.

* cited by examiner

*Primary Examiner* — Patrick Edouard
*Assistant Examiner* — Matthew Genack
(74) *Attorney, Agent, or Firm* — Harness, Dickey & Pierce

(57) ABSTRACT

One object of the present invention is a method for the support of high bit rate services in a mobile communication system, said method comprising a step wherein a network entity signals to a Mobile Station, according to signalling procedures used in case of access via a broadband Access Network, at least one bit rate higher than the maximum bit rate specified in case of access via a non broadband Access Network, based on bit rates as defined according to signalling procedures used in case of access via said non broadband Access Network.

3 Claims, 2 Drawing Sheets

MS            UNC/GANC            MSC

ASSIGNMENT REQUEST

ACTIVATE CHANNEL URR/GA-CSR

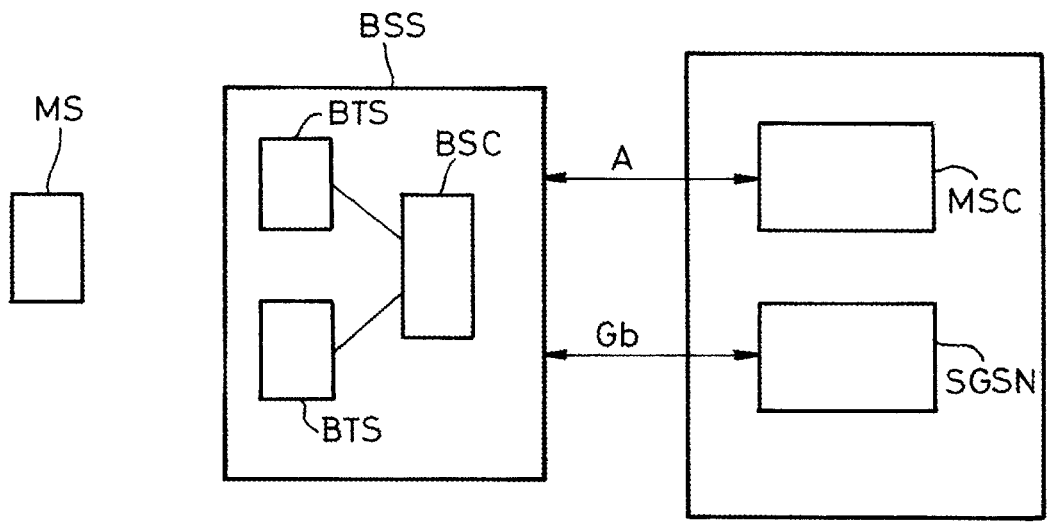
FIG_1
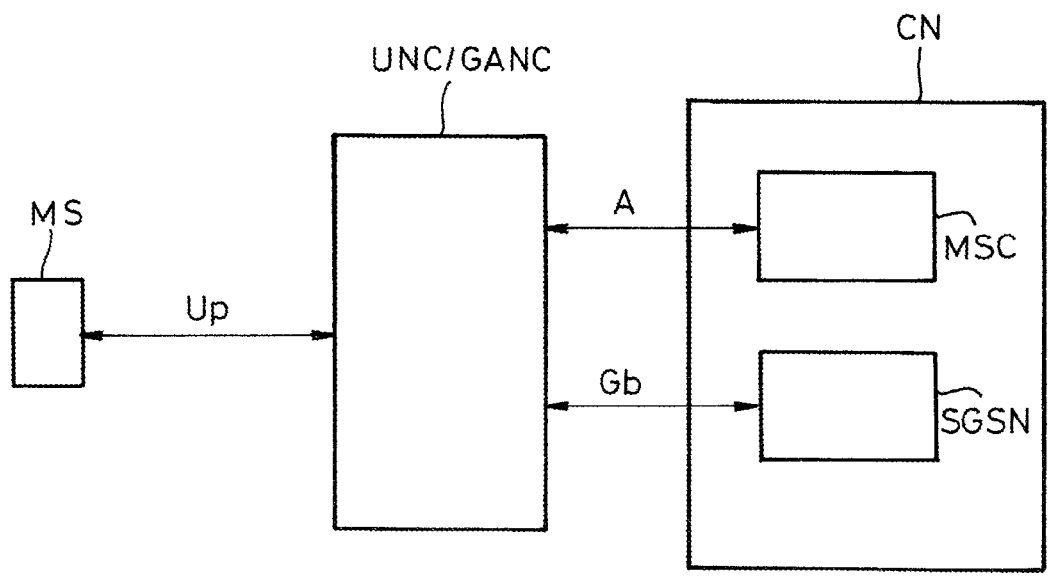
FIG_2

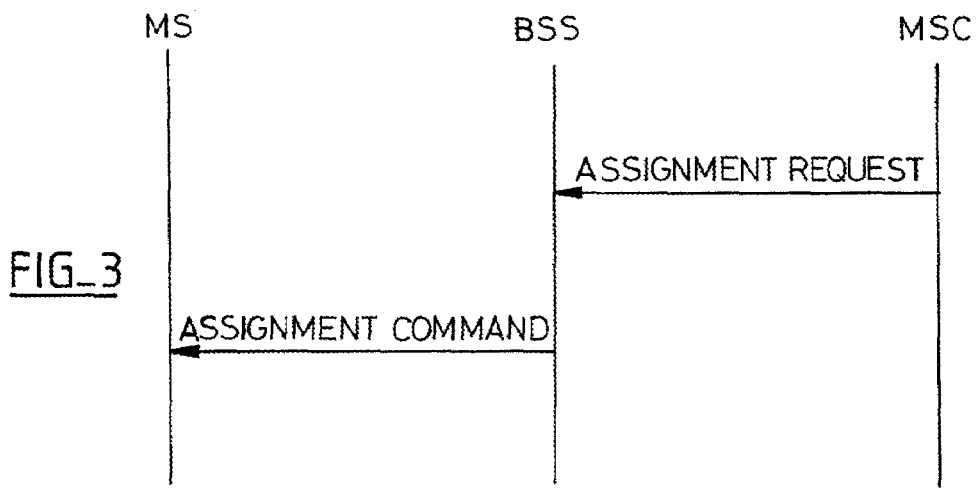
FIG_3
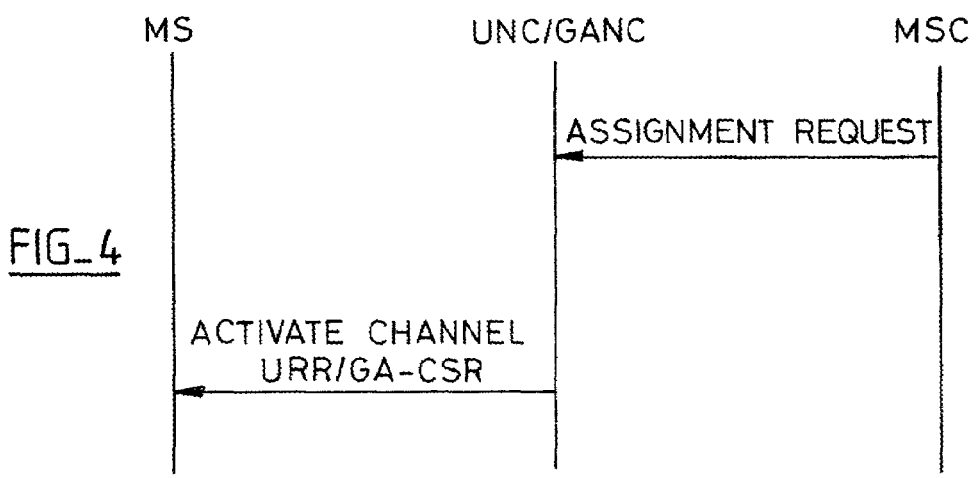
FIG_4
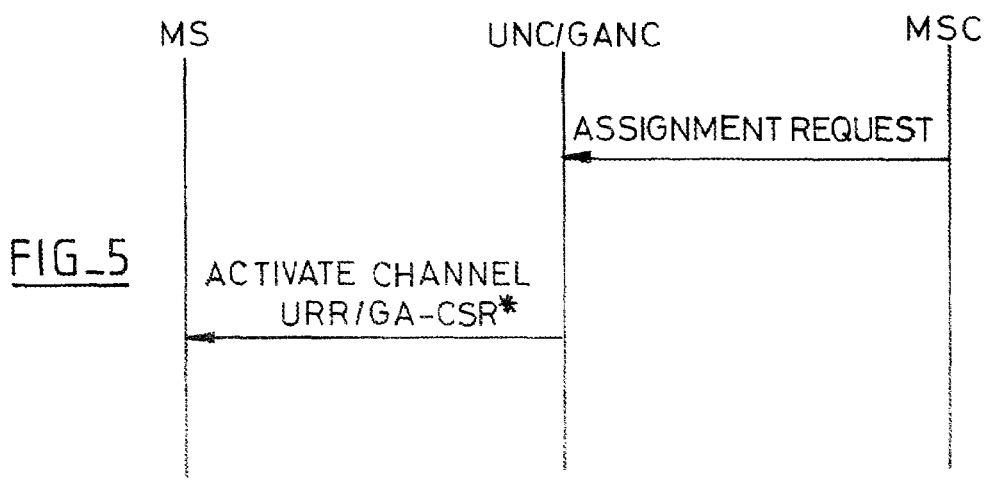
FIG_5

METHOD FOR THE SUPPORT OF HIGH BIT RATE SERVICES IN A MOBILE COMMUNICATION SYSTEM

CROSS-REFERENCE TO RELATED APPLICATIONS

This application is based on European Patent Application No. 06300074.9 filed Jan. 26, 2006, the disclosure of which is hereby incorporated by reference thereto in its entirety, and the priority of which is hereby claimed under 35 U.S.C. §119.

BACKGROUND OF THE INVENTION

1. Field of the Invention

The present invention generally relates to mobile communication systems.

In a general way, mobile communication systems are subject to standardisation; therefore a detailed description of such systems can be found in the corresponding standards, published by the corresponding standardisation bodies, such as for example 3GPP (3$^{rd}$ Generation Partnership Project).

2. Description of the Prior Art

It is simply recalled that the architecture of mobile communication networks is logically divided into an Access Network (AN) and a Core Network (CN), and the architecture of the Core Network is logically divided into different domains, including a Circuit Switched (CS) domain and a Packet Switched (PS) domain.

An example of such systems is the GSM/GPRS system, wherein, as recalled in FIG. 1:
- the AN, called Base Station Subsystem (BSS), comprises network elements such as in particular Base Transceiver Station (BTS) and Base Station Controller (BSC),
- the CN comprises network elements such as in particular Mobile Switching Center (MSC) for the CS domain, and Serving GPRS Support Node (SGSN) for the PS domain.

It is recalled that the radio access technology used by GSM is based on Time Division Multiple Access (TDMA), where the transmission structure on the radio interface between AN and Mobile Station (MS) is organised in frames in turn organised in timeslots.

As recalled in FIG. 3, resource management procedures in systems such as GSM include the sending by the MSC to the BSS of an Assignment Request message according to the BSS Management Application Part (BSSMAP) protocol, and the sending by the BSS to the MS of an Assignment Command message according to the Radio Resource Control (RRC) protocol.

As specified in 3GPP TS 44.018, the Assignment Command message contains a description of the channel configuration to be used by the MS. In particular, the Assignment Command message contains a Channel Mode Information Element, which gives information on the mode of coding/decoding and transcoding, and is coded as follows:

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | signalling only |
| 0 | 0 | 0 | 0 | 0 | 0 | 0 | 1 | speech full rate or half rate version 1 |
| 0 | 0 | 1 | 0 | 0 | 0 | 0 | 1 | speech full rate or half rate version 2 |
| 0 | 1 | 0 | 0 | 0 | 0 | 0 | 1 | speech full rate or half rate version 3 |
| 1 | 0 | 0 | 0 | 0 | 0 | 0 | 1 | speech full rate or half rate version 4 |
| 1 | 0 | 0 | 0 | 0 | 0 | 1 | 0 | speech full rate or half rate version 5 |
| 1 | 0 | 0 | 0 | 0 | 0 | 1 | 1 | speech full rate or half rate version 6 |
| 0 | 1 | 1 | 0 | 0 | 0 | 0 | 1 | data, 43.5 kbit/s (downlink) + 14.5 kbps (uplink) |
| 0 | 1 | 1 | 0 | 0 | 0 | 1 | 0 | data, 29.0 kbit/s (downlink) + 14.5 kbps (uplink) |
| 0 | 1 | 1 | 0 | 0 | 1 | 0 | 0 | data, 43.5 kbit/s (downlink) + 29.0 kbps (uplink) |
| 0 | 1 | 1 | 0 | 0 | 1 | 1 | 1 | data, 14.5 kbit/s (downlink) + 43.5 kbps (uplink) |
| 0 | 1 | 1 | 0 | 0 | 1 | 0 | 1 | data, 14.5 kbit/s (downlink) + 29.0 kbps (uplink) |
| 0 | 1 | 1 | 0 | 0 | 1 | 1 | 0 | data, 29.0 kbit/s (downlink) + 43.5 kbps (uplink) |
| 0 | 0 | 1 | 0 | 0 | 1 | 1 | 1 | data, 43.5 kbit/s radio interface rate |
| 0 | 1 | 1 | 0 | 0 | 0 | 1 | 1 | data, 32.0 kbit/s radio interface rate |
| 0 | 1 | 0 | 0 | 0 | 0 | 1 | 1 | data, 29.0 kbit/s radio interface rate |
| 0 | 0 | 0 | 0 | 1 | 1 | 1 | 1 | data, 14.5 kbit/s radio interface rate |
| 0 | 0 | 0 | 0 | 0 | 0 | 1 | 1 | data, 12.0 kbit/s radio interface rate |
| 0 | 0 | 0 | 0 | 1 | 0 | 1 | 1 | data, 6.0 kbit/s radio interface rate |
| 0 | 0 | 0 | 1 | 0 | 0 | 1 | 1 | data, 3.6 kbit/s radio interface rate |

Thus, in GSM specifications, the bitrate over the radio interface for one timeslot is defined in the Channel Mode Information Element. With Enhanced Data rates for GSM Evolution (EDGE) technology, it is possible to go up to a maximum bit rate of 43.5 kbit/s with a single timeslot.

In a general way, in order to enable such systems (such as for example the above recalled GSM system) initially mainly designed to support telephony services, to support higher bit rate services (such as in particular videotelephony services), a multislot allocation mechanism has been specified, enabling to allocate several timeslots to a Mobile Station, instead of a single timeslot.

Thus, in GSM specifications, it is possible for the MSC to request high bit rates via the Assignment Request message over the A interface. In particular, this allows the support of 64 kbit/s H.324M video-telephony and higher bit rates.

To support the multislot allocation mechanism, the Assignment Command message contains a "Description of the multislot configuration (Multislot Allocation)" Information Element followed by a list of "Mode of Channel Set" Information Elements. The purpose of the Multislot Allocation Information Element is to provide a description of which channels are used in downlink and uplink respectively, in a multislot configuration. It also groups the channels into Channel Sets, used to identify channels that carry related user information flows which therefore need to be handled together. The Channel Mode for each Channel Set can be defined by a separate "Mode of Channel Set" Information Element.

In other words, in GSM specifications, a combination of several timeslots, allowing higher bitrates, is possible and defined in the Assignment Command message via the "Description of the multislot configuration" Information Element.

In a general way, there is also an evolution of such systems towards fixed-mobile convergence.

An example of such an evolution corresponds to a system wherein mobile services can be provided by the same Core Network to a Mobile Station not only via an Access Network such as for example the above recalled Base Station Subsystem of GSM, but also via an Access Network using a fixed (Broadband) network.

An example of an Access Network using a fixed network corresponds to the Unlicensed Mobile Access Network (UMAN) or the Generic Access Network (GAN), as specified in particular in UMA specifications and in 3GPP specifications, providing a complement to the traditional coverage provided by systems such as GSM/GPRS.

As recalled in FIG. 2, the architecture for UMAN/GAN comprises, in particular, the following elements:
Mobile Stations (MS),
Unlicensed Network Controller (UNC)/Generic Access Network Controller (GANC).

The UNC/GANC appears to the CN as a BSS. The UNC/GANC communicates with the CS domain via the A interface, and with the PS domain via the Gb interface. The MS and the UNC/GANC communicate via a Broadband or Generic IP Access Network (not specifically illustrated in FIG. 2) supporting high bit rates. The interface between UNC/GANC and MS is called Up interface. UMAN/GAN uses wireless technologies such as for example Bluetooth or WiFi, enabling to support high bit rates.

More generally, such Access Network supporting high bit rates (such as UMAN/GAN network) will also be called hereinafter broadband Access Network, as opposed to a non broadband Access Network (such as for example the BSS or Radio Access Network of GSM).

As recalled in FIG. 4, resource management procedures in a system such as the one illustrated in FIG. 2 include the sending by the MSC to the UNC/GANC of an Assignment Request message according to the BSS Management Application Part (BSSMAP) protocol, and the sending by the UNC/GANC to the MS of an Activate Channel URR/GA-CSR message, as specified in UMA/3GPP specifications.

The Activate Channel URR/GA-CSR message contains UMA/GAN bearer path setup Information Elements, such as in particular Channel Mode, UDP Port & IP Address for the uplink RTP stream, . . . etc. The Channel Mode Information Element gives information on the mode of coding/decoding and transcoding.

According to the current state of UMA/3GPP specifications, the Channel Mode Information Element as defined in 3GPP TS 44.018 has been reused in the Activate Channel URR/GA-CSR message.

SUMMARY OF THE INVENTION

In such a context, the present invention recognizes in particular the following problems.

With the current state of UMA/3GPP specifications, even if it is possible for the CN to request high bit rates in CS domain via the A interface, it is not possible for the UNC/GANC to signal these bitrates to the MS on the Up interface. Indeed, the Channel Mode Information Element as defined in 3GPP TS 44.018 has been reused in the Activate Channel URR/GA-CSR message, without taking into account that the UMAN/GAN radio interface is not organised in the same way as the GSM radio interface. Therefore, with the current state of UMAN/GAN specifications, it is not possible to signal bitrates exceeding the ones defined in the GSM Channel Mode Information Element, i.e. 43.5 kbit/s. In other words, with the current state of UMAN/GAN specifications, it is not possible to support higher bitrates that are requested by the Core Network via the A interface. In particular, it is not possible to support videotelephony. Still in other words, there is a need for a mechanism to enable the support of higher bit rates for CS services, in the case of access via a broadband Access Network such as in particular UMAN or GAN.

The present invention in particular enables to solve part or all of the above-mentioned problems, or to avoid part or all of the above-mentioned drawbacks. In particular, it is an object of the present invention to enable such a support of high bit rate services, in particular while introducing as few changes as possible to the current state of UMA/3GPP specifications. More generally, it is an object of the present invention to improve the performances in such systems.

These and other objects are achieved, in one aspect of the present invention, by a method for the support of high bit rate services in a mobile communication system, said method comprising a step wherein a network entity signals to a Mobile Station, according to signalling procedures used in case of access via a broadband Access Network, at least one bit rate higher than the maximum bit rate specified in case of access via a non broadband Access Network, based on bit rates as defined according to signalling procedures used in case of access via said non broadband Access Network.

These and other objects are achieved, in another aspect of the present invention, by a method for the signalling of a bit rate information on the interface between Unlicensed Network Controller UNC/Generic Access Network Controller GANC and Mobile Station in an Unlicensed Mobile Access Network UMAN/Generic Access Network GAN, said method comprising a step wherein said UNC/GANC sends to said Mobile Station an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate value not higher than the maximum bit rate supported by one single timeslot on the interface between BSS and Mobile Station is set in said Channel Mode Information Element, said Activate Channel URR/GA-CSR message further containing a multiplication factor parameter, said signalled bit rate information being obtained by multiplication, by said multiplication factor parameter, of at least one bitrate value set by said coding in the Channel Mode Information Element of said Activate Channel URR/GA-CSR message.

These and other objects are achieved, in another aspect of the present invention, by a method for the signalling of a bit rate information on the interface between Unlicensed Network Controller UNC/Generic Access Network Controller GANC and Mobile Station in a Unlicensed Mobile Access Network UMAN/Generic Access Network GAN, said method comprising a step wherein said UNC/GANC sends to said Mobile Station an Activate Channel URR/GA-CSR message, said message containing a plurality of Mode of Channel Set Information Elementscoded as the Mode of Channel Set Information Elements of an Assignment Command message sent on the interface between BSS and Mobile Station in a GSM network, said coding being such that a bit rate value not higher than the maximum bit rate supported by one single timeslot on the interface between BSS and Mobile Station is set in a Mode of Channel Set Information Element, said signalled bit rate information being obtained by addition of bit rate values set by said coding in a plurality of Mode of Channel Set Information Elements of said Activate Channel URR/GA-CSR message.

These and other objects are achieved, in another aspect of the present invention, by a method for the signalling of a bit rate information on the interface between Unlicensed Network Controller UNC/Generic Access Network Controller GANC and a Mobile Station in a Unlicensed Mobile Access Network UMAN/Generic Access Network GAN, said method comprising a step wherein said UNC/GANC sends to said Mobile Station an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate value higher than the maximum bit rate supported by one single timeslot on the interface between BSS and Mobile Station can be set in said Channel Mode Information Element, said signalled bit rate information corresponding to at least one bit rate value higher than said maximum bit rate, set by said coding in the Channel Mode Information Element of said Activate Channel URR/GA-CSR message.

The present invention also has for its object a network entity such as UNC/GANC, and a Mobile Station, for performing any one of said methods.

BRIEF DESCRIPTION OF THE DRAWINGS

These and other objects of the present invention will become more apparent from the following description taken in conjunction with the accompanying drawings:

FIG. 1 is intended to recall the general architecture of GSM/GPRS,

FIG. 2 is intended to recall the general architecture of UMAN/GAN,

FIG. 3 is intended to recall the signalling of the Assignment Command message in a GSM network, FIG. 4 is intended to recall the signalling of the Activate Channel URR/GA-CSR message in an UMAN/GAN network, FIG. 5 is intended to illustrate an example of a method according to the present invention.

MORE DETAILED DESCRIPTION OF THE INVENTION

The present invention may also be explained as follows.

The present invention in particular proposes to enhance the UMA/3GPP specifications to allow high bitrates requested by the Core Network in CS domain, by adding or modifying parameters in the existing Activate Channel URR/GA-CSR message over the Up interface, as illustrated in FIG. 5 where the corresponding message is noted Activate Channel URR/GA-CSR*.

In one of its different aspects, the present invention proposes to add a "multiplication factor" parameter in the Activate Channel URR/GA-CSR message, this parameter being used as multiplication factor of the bitrates (uplink and downlink) set in the Channel Mode Information Element of this message.

In other words, in one of its different aspects, the present invention proposes a method for the signalling of a bit rate information on the interface between Unlicensed Network Controller UNC/Generic Access Network Controller GANC and Mobile Station in an Unlicensed Mobile Access Network UMAN/Generic Access Network GAN, said method comprising a step wherein said UNC/GANC sends to said Mobile Station an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate value not higher than the maximum bit rate supported by one single timeslot on the interface between BSS and Mobile Station is set in said Channel Mode Information Element, said Activate Channel URR/GA-CSR message further containing a multiplication factor parameter, said signalled bit rate information being obtained by multiplication, by said multiplication factor parameter, of at least one bitrate value set by said coding in the Channel Mode Information Element of said Activate Channel URR/GA-CSR message.

The present invention also proposes a network entity such as UNC/GANC, and a Mobile Station, for performing said method.

The present invention therefore also proposes an Unlicensed Network Controller UNC/Generic Access Network Controller GANC for an Unlicensed Mobile Access Network UMAN/Generic Access Network GAN, comprising means for signalling a bit rate information to a Mobile Station, said means comprising means for sending to said Mobile Station an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate value not higher than the maximum bit rate supported by one single timeslot on the interface between BSS and Mobile Station is set in said Channel Mode Information Element, said Activate Channel URR/GA-CSR message further containing a multiplication factor parameter, said signalled bit rate information being obtained by multiplication, by said multiplication factor, of at least one bitrate value set by said coding in the Channel Mode Information Element of Activate Channel URR/GA-CSR message.

The present invention therefore also proposes a Mobile Station comprising means for receiving a bit rate information signalled by an Unlicensed Network Controller UNC/Generic Access Network Controller GANC in an Unlicensed Mobile Access Network UMAN/Generic Access Network GAN, said means comprising:

means for receiving from said UNC/GANC an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate values not higher than the maximum bit rate supported by one single timeslot on the interface between BSS and Mobile Station is set in said Channel Mode Information Element, said Activate Channel URR/GA-CSR message further containing a multiplication factor parameter, means for multiplying, by said multiplication factor parameter, at least one bitrate value set by said coding in the Channel Mode Information Element of said Activate Channel URR/GA-CSR message, to obtain said signalled bit rate information.

In another of its different aspects, the present invention proposes to add several parameters similarly to those which exist in the Assignment Command message (as specified by 3GPP TS 44.018) to describe a combination of channels, i.e. the "Description of the Multislot Configuration" Information Element and the associated "Mode of Channel Sets" information Elements of the Assignment Command message.

The purpose of the Multislot Allocation Information Element is to provide a description of which channels are used in downlink and uplink respectively, in a multislot configuration. It also groups the channels into channel sets; the channel mode for each channel set can be defined by a separate information element. The Channel Mode information element gives information of the mode on coding/decoding and transcoding. Thus in this aspect of the present invention, the total throughput to be carried on the Broadband radio interface in association with an Assignment Command carrying a Multislot Allocation Information Element, is the sum of all the throughputs declared in all channel sets described in this Multislot Allocation Information Element.

In other words, in another of its different aspects, the present invention proposes a method for the signalling of a bit rate information on the interface between Unlicensed Network Controller UNC/Generic Access Network Controller GANC and Mobile Station in an Unlicensed Mobile Access Network UMAN/Generic Access Network GAN, said method comprising a step wherein said UNC/GANC sends to said Mobile Station an Activate Channel URR/GA-CSR message, said message containing a plurality of Mode of Channel Set Information Elements coded as the Mode of Channel Set Information Elements of an Assignment Command message sent on the interface between BSS and Mobile Station in a GSM network, said coding being such that a bit rate value not higher than the maximum bit rate supported by one single timeslot on the interface between BSS and Mobile Station is set in a Mode of Channel Set Information Element, said signalled bit rate information being obtained by addition of a plurality of bit rate values set by said coding in a plurality of Mode of Channel Set Information Elements of said Activate Channel URR/GA-CSR message.

The present invention also proposes a network entity such as UNC/GANC, and a Mobile Station, for performing said method.

The present invention therefore also proposes an Unlicensed Network Controller UNC/Generic Access Network Controller GANC for an Unlicensed Mobile Access Network UMAN/Generic Access Network GAN, comprising means for signalling a bit rate information to a Mobile Station, said means comprising means for sending to a Mobile Station an Activate Channel URR/GA-CSR message, said message containing a plurality of Mode of Channel Set Information Elementscoded as the Mode of Channel Set Information Elements of an Assignment Command message sent on the interface between Base Station Subsystem BSS and Mobile Station in a GSM network, said coding being such that a bit rate value not higher than the maximum bit rate supported by one single timeslot on the interface between BSS and Mobile Station is set in a Mode of Channel Set Information Element, said signalled bit rate information being obtained by addition of a plurality of bit rate values set by said coding in a plurality of Mode of Channel Set Information Elements of said Activate Channel URR/GA-CSR message.

The present invention therefore also proposes a Mobile Station comprising means for receiving a bit rate information signalled by an Unlicensed Network Controller UNC/Generic Access Network Controller GANC in an Unlicensed Mobile Access Network UMAN/Generic Access Network GAN, said means comprising:
    means for receiving from said UNC/GANC an Activate Channel URR/GA-CSR message, said message containing a plurality of Mode of Channel Set Information Elementscoded as the Mode of Channel Set Information Elements of an Assignment Command message sent on the interface between BSS and Mobile Station in a GSM network, said coding being such that a bit rate value not higher than the maximum bit rate supported by one single timeslot on the interface between BSS and Mobile Station is set in a Mode of Channel Set Information Element,
    means for adding a plurality of bit rate values set by said coding in a plurality of Mode of Channel Set Information Elements of said Activate Channel URR/GA-CSR message, to obtain said signalled bit rate information.

In another of its different aspects, the present invention proposes to add, in the definition of the possible values of the Channel Mode Information Element of the Assignment Command message sent on the interface between a Base Station Subsystem and a Mobile Station, new possible values allowing to describe a higher requested bitrate than can be sent in case of the interface between BSS and Mobile Station.

In other words, in another of its different aspects, the present invention proposes a method for the signalling of a bit rate information on the interface between Unlicensed Network Controller UNC/Generic Access Network Controller GANC and a Mobile Station in an Unlicensed Mobile Access Network UMAN/Generic Access Network GAN, said method comprising a step wherein said UNC/GANC sends to said Mobile Station an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate value higher than the maximum bit rate supported by one single timeslot on the interface between BSS and Mobile Station can be set in said Channel Mode Information Element, said signalled bit rate information corresponding to at least one bit rate value higher than said maximum bit rate, set by said coding in the Channel Mode Information Element of said Activate Channel URR/GA-CSR message.

The present invention also proposes a network entity such as UNC/GANC, and a Mobile Station, for performing said method.

Therefore, the present invention also proposes an Unlicensed Network Controller UNC/Generic Access Network Controller GANC for an Unlicensed Mobile Access Network UMAN/Generic Access Network GAN, comprising means for signalling a bit rate information to a Mobile Station, said means comprising means for sending to a Mobile Station an Activate Channel URR/GA-CSR message, said message containing a Channel Mode Information Element coded as the Channel Mode Information Element of an Assignment Command message sent on the interface between Base Station Subsystem BSS and Mobile Station in a GSM network, said coding being such that a bit rate value higher than the maximum bit rate supported by one single timeslot on the interface between BSS and Mobile Station can be set in said Channel Mode Information Element, said signalled bit rate information corresponding to at least one bit rate value higher than said maximum bit rate, set by said coding in the Channel Mode Information Element of said Activate Channel URR/GA-CSR message.

Therefore, the present invention also proposes a Mobile Station, comprising means for receiving a bit rate information signalled by an Unlicensed Network Controller UNC/Generic Access Network Controller GANC in an Unlicensed Mobile Access Network UMAN/Generic Access Network GAN, said means comprising means for receiving from said UNC/GANC an Activate Channel URR/GA-CSR message, said message containing a Channel Mode Information Element coded as the Channel Mode Information Element of an Assignment Command message sent on the interface between BSS and Mobile Station in a GSM network, said coding being such that a bit rate value higher than the maximum bit rate supported by one single timeslot on the interface between BSS and Mobile Station can be set in said Channel Mode Information Element, said signalled bit rate information corresponding to at least one bit rate value higher than said maximum bit rate, set by said coding in the Channel Mode Information Element of said Activate Channel URR/GA-CSR message.

In yet another of its different aspects, the present invention proposes a method for the support of high bit rate services in a mobile communication system, said method comprising a step wherein a network entity signals to a Mobile Station, according to signalling procedures used in case of access via a broadband Access Network, at least one bit rate higher than the maximum bit rate specified in case of access via a non broadband Access Network, based on bit rates as defined according to signalling procedures used in case of access via said non broadband Access Network.

In an example, said maximum bit rate is the maximum bit rate to be supported in a single Time Slot of a non Broadband Access Network using TDMA.

In an embodiment, said step of signalling comprises the signalling of a first information corresponding to a bit rate lower or equal to said single timeslot maximum bit rate, and a second information, enabling, in combination with said first information, to indicate a bit rate higher than said single timeslot maximum bit rate.

In an example, said second information corresponds to a multiplication factor.

In another embodiment, said step of signalling comprises the signalling of several bit rates lower or equal to said single timeslot maximum bit rate, enabling, in combination, to indicate a bit rate higher than said single timeslot maximum bit rate.

In an example, said signalling of several bit rates is based on procedures used for the description of a multislot configuration in case of access via a non broadband Access Network using TDMA.

In another embodiment, said step of signalling comprises the signalling of a bit rate higher than said single timeslot maximum bit rate.

In an example, said broadband Access Network corresponds to an Unlicensed Mobile Access network, and said step of signalling comprises the sending of a UMA RR Activate Channel message to said Mobile Station by an Unlicensed Network Controller.

In another example, said broadband Access Network corresponds to a Generic Access Network, and said step of signalling comprises the sending of a GA-CSR Activate Channel message to said Mobile Station by a Generic Access Network Controller.

In an example, said non broadband Access Network corresponds to the Base Station Subsystem of GSM, and said signalling procedures used in case of access via said non broadband Access Network comprise the sending of an Assignment Command message to a Mobile Station by said Base Station Subsystem.

The present invention also proposes a network entity, such as in particular UNC/GANC, and a Mobile Station, for performing said method.

Therefore, the present invention also proposes a network entity for a mobile communication system comprising means for signalling to a Mobile Station, according to signalling procedures used in case of access via a broadband Access Network, at least one bit rate higher than the maximum bit rate specified in case of access via a non broadband Access Network, based on bit rates as defined according to signalling procedures used in case of access via said non broadband Access Network.

Therefore, the present invention also proposes a Mobile Station comprising means for receiving, according to signalling procedures used in case of access via a broadband Access Network, at least one bit rate higher than the maximum bit rate specified in case of access via a non broadband Access Network, signalled to said Mobile Station according to signalling procedures used in case of access via a broadband Access Network, based on bit rates as defined according to signalling procedures used in case of access via said non broadband Access Network.

The detailed implementation of the above-mentioned means does not raise any special problem for a person skilled in the art, and therefore such means do not need to be more fully disclosed than has been made above, by their function, for a person skilled in the art.

The invention claimed is:

1. A method for the signaling of bit rate information on a first interface between Unlicensed Network Controller UNC/Generic Access Network Controller GANC (UNC/GANC) and mobile station in an Unlicensed Mobile Access Network UMAN/Generic Access Network GAN, said method comprising:

sending, by said UNC/GANC, an Activate Channel URR/GA-CSR message to said mobile station, and said Activate Channel URR/GA-CSR message includes a Channel Mode Information Element coded as the Channel Mode Information Element of an Assignment Command message sent on a second interface between Base Station Subsystem BSS and mobile station in a GSM network, said coding being such that a bit rate value higher than a maximum bit rate supported on the second interface can be set in the Channel Mode Information Element, said signaled bit rate information corresponding to at least one bit rate value higher than said maximum bit rate, set by said coding in the Channel Mode Information Element of said Activate Channel URR/GA-CSR message.

2. An Unlicensed Network Controller UNC/Generic Access Network Controller GANC (UNC/GANC) for a Unlicensed Mobile Access Network UMAN/Generic Access Network GAN, configured to signal bit rate information to a mobile station, and to send to said mobile station an Activate Channel URR/GA-CSR message, and said Activate Channel URR/GA-CSR message including a Channel Mode Information Element coded as the Channel Mode Information Element of an Assignment Command message sent on an interface between Base Station Subsystem BSS and mobile station in a GSM network, said coding being such that a bit rate value higher than the maximum bit rate supported on the interface can be set in said Channel Mode Information Element, said signaled bit rate information corresponding to at least one bit rate value higher than said maximum bit rate, set by said coding in the Channel Mode Information Element of said Activate Channel URR/GA-CSR message.

3. A mobile station configured to receive bit rate information signaled by an Unlicensed Network Controller UNC/Generic Access Network Controller GANC (UNC/GANC) in an Unlicensed Mobile Access Network UMAN/Generic Access Network GAN, said mobile station configured to receive from said UNC/GANC an Activate Channel URR/GA-CSR message, said Activate Channel URR/GA-CSR message including a Channel Mode Information Element coded as the Channel Mode Information Element of an Assignment Command message sent on an interface between Base Station Subsystem BSS and mobile station in a GSM network, and said coding being such that a bit rate value higher than the maximum bit rate supported on the interface can be set in said Channel Mode Information Element, said signaled bit rate information corresponding to at least one bit rate value higher than said maximum bit rate, set by said coding in the Channel Mode Information Element of said Activate Channel URR/GA-CSR message.

* * * * *